Feb. 7, 1956  J. H. MILLAR  2,733,940
END FITTING FOR FLEXIBLE HOSE HAVING A REINFORCING LAYER
Filed April 13, 1951  2 Sheets-Sheet 1

*Inventor*
JOHN HUMPHREY MILLAR

By *[signature]*
Agents

Feb. 7, 1956 J. H. MILLAR 2,733,940
END FITTING FOR FLEXIBLE HOSE HAVING A REINFORCING LAYER
Filed April 13, 1951 2 Sheets-Sheet 2
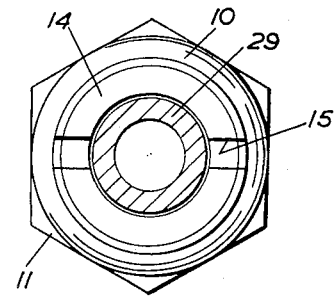
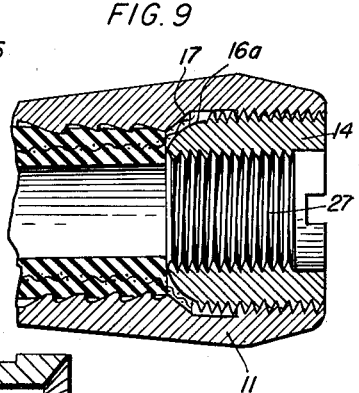
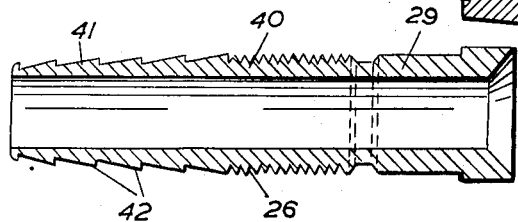
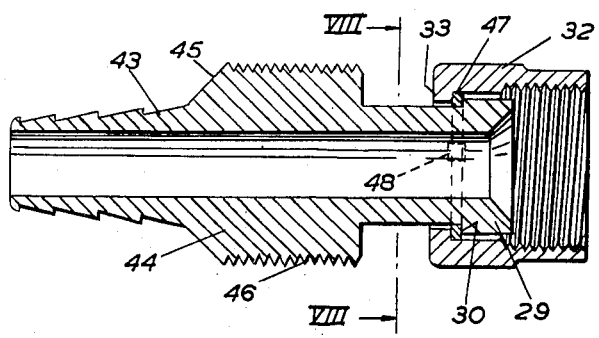
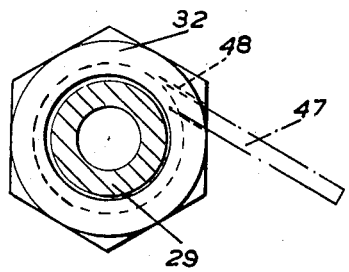
Inventor
JOHN HUMPHREY MILLAR
Agents

United States Patent Office 2,733,940
Patented Feb. 7, 1956

2,733,940
END FITTING FOR FLEXIBLE HOSE HAVING A REINFORCING LAYER

John Humphrey Millar, Newport, R. I.

Application April 13, 1951, Serial No. 220,803

Claims priority, application Great Britain April 28, 1950

3 Claims. (Cl. 285—72)

This invention concerns improvements in or relating to end fittings, e. g. couplings, for flexible hose and the methods of applying such fittings to the hose, the invention being especially applicable to end fittings for reinforced hose, e. g. hose having, for example, at least one braided metallic or similar reinforcing interlayer.

A variety of detachable and re-usable end fittings have already been proposed wherein the end of a reinforced flexible, e. g. rubber, hose is trapped in the end fitting between a spigot or insert extending into the bore of the hose and an external ferrule surrounding the hose.

An object of this invention is to provide an improved end fitting of this general kind which is detachable from the hose and re-usable so that if, for example, the hose becomes damaged, the end fitting can be removed from the hose, the damaged section of the latter discarded and the end fitting re-attached to the remaining sound portion of the hose.

A further object of the invention is to provide a detachable and re-usable end fitting suitable for use with high pressure wire braided hose and which, when fitted to such a hose, will effect a mechanical interlock between itself and the said wire braid, as well as a fluid tight seal with the rubber or like body of the hose.

A still further object of the invention is to provide a detachable and re-usable end fitting which will safeguard against the fitting being blown off the hose when the external temperature around the fitting is elevated and when the pressure within the hose is substantial, say, for example, in the region of 100 lbs. per square inch or more, i. e. in circumstances such as are prevalent during the flame tests applied to flexible hose assemblies for use in aircraft, particularly in aircraft engine power plants e. g. jet engine power plants where working temperatures may be elevated.

According to this invention there is provided a method of applying an end fitting to a flexible hose having an internal tubular reinforcing layer, e. g. a tubular layer of braided metal wire, this method comprising baring the end of the said tubular reinforcing layer externally and internally at the hose end, applying to the exterior of the hose end a ferrule having an internal surface which is oblique to the axis thereof, introducing a tubular bush, sleeve, lining, or gripper (hereinafter referred to as a "gripper") into said ferrule from the opposite end to the hose, and releasably engaging the gripper in the ferrule, said gripper having an external surface oblique to it saxis and adapted to butt against the aforesaid oblique face of the ferrule in the engaged condition to trap and secure the bared hose reinforcement between them. It may be preferred to use a gripper having a rounded or spherical external surface to trap and securely grip the bared wire braid hose reinforcement against the aforesaid oblique face of the ferrule.

In addition the gripper may have a spigot or insert integrally or detachably secured therein so as to project from the leading end thereof, so that it is introduced into the hose to project into the latter beyond the gripper portion and serving to trap the unbared hose against the inside of the ferrule.

Thus the invention also includes a method of applying an end fitting to a flexible hose having an internal tubular reinforcing layer, this method comprising baring the end of said tubular reinforcing layer externally and internally at the hose end, applying a ferrule to the exterior of the hose end and an adjoining portion of the hose, introducing a tubular gripper into said ferrule and distorting the bared reinforcement radially and releasably trapping the same between opposed surfaces, respectively on the ferrule and gripper, oblique to the axis of the fitting, and introducing a spigot or insert into the bore of the hose to trap the unbared wall of the hose between the spigot or insert and the ferrule.

According to a further part of this invention there is provided an end fitting for a flexible hose having an internal tubular reinforcing layer, e. g. a tubular layer of braided metal wire, this end fitting comprising a ferrule for application over the exterior of the hose end, and a tubular gripper adapted to be releasably secured coaxially in the said ferrule, said gripper and said ferrule respectively having an annular external and an annular internal surface which are positioned to be applied face-to-face when the gripper is secured in the ferrule to trap and anchor the bared hose reinforcement between them.

The fitting may include a spigot or insert adapted to project forward of the gripper into the hose beyond the bared reinforcement to trap the unbared hose end part against the ferrule, thereby effecting a fluid tight seal.

The said gripper is preferably screwed into the ferrule and the spigot or insert may be formed integrally with the gripper or may be formed separately thereof and fixed therein, e. g. screwed thereinto.

The annular surfaces between which the bared reinforcement of the hose is adapted to be clamped are conveniently formed by making the inner end of the said tubular gripper of a frusto-conical form and by providing the interior surface of the ferrule with a corresponding frusto-conical shoulder. Alternatively, the surface of one of these members may be convex to grip the wire braid firmly against a frusto-conical surface of the co-acting member.

The interior of the ferrule and/or the exterior of the spigot or insert may be threaded to facilitate assembly with the hose. Such teeth may, for example, be of buttress shape and be arranged so as to oppose the withdrawal of the hose from the end of the ferrule remote from the said gripper.

The outer end of the said insert or spigot may be in the form of, or carry a part of, a union for connection to a co-operating part to join the hose to some other equipment.

In order that the invention and the method by which it may be carried into practice may be readily understood, two embodiments of the same will now be described by way of example with reference to the accompanying drawings, in which:

Figure 5 is an end view of the assembled fitting as seen from the section line V—V of Figure 4 in the direction of the arrows;

Figure 6 is an axial section through a modified form of spigot;

Figure 7 is a similar view through a second embodiment of the invention in which the gripper and spigot are integral;

Figure 8 is a view from VIII—VIII in Figure 7, taken in the direction of the arrows; and Figure 9 is a broken axial section through the hose, and the ferrule and gripper connected thereto, showing the wire braid reinforcement of the hose trapped and secured between a frusto-conical surface of the ferrule and a spherical surface of the gripper.

Figure 2:
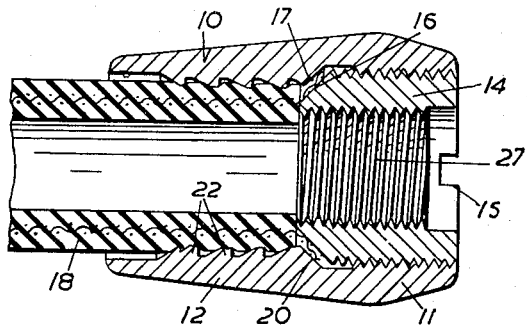
Figure 2 is a similar section showing the gripper screwed into the ferrule in the next assembly stage.

In the first embodiment of the invention the end fitting is in the form of a coupling unit and comprises a ferrule 10 which has opposite external tapers at the head 11 and the body 12 and is of a somewhat streamlined form. Internally the ferrule is provided with a fine screw thread 13 at the head to receive an externally screw-threaded tubular gripper 14 furnished with a diametrical recess 15 at its rear or outer end to enable it to be screwed co-axially into the ferrule, as in Figure 2.

The leading or inner end of the gripper 14 is provided with a frusto-conical annular surface 16 which is inclined in a radial plane at about 45° to the axis thereof. The ferrule 10 is also provided with a corresponding internal annular frusto-conical surface 17 having a similar obliquity to the axis of the latter.

Figure 9 illustrates a construction in which the forward end of the gripper is provided with a spherical surface for engaging with the bared wire braid reinforcement.

Figure 1:
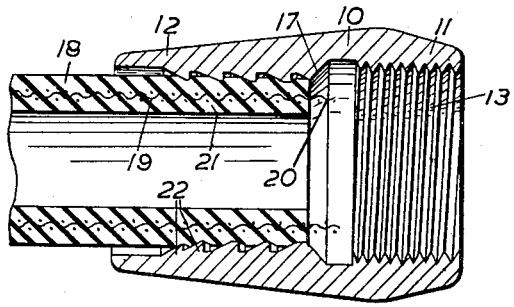
Figure 1 is an axial section through the ferrule showing the hose end inserted therein in a stage in the assembly in accordance with a first embodiment.

When the end fitting is to be applied to a hose this latter, designated 18 in the drawing and having one or more embedded tubular reinforcing layers 19 of braided wire, is cut off square at the end and the braid 19 bared internally and externally by removing the rubber or like material of the carcase of the hose for about a quarter of an inch from the cut end, as indicated at 20 in the drawings. The ferrule 10 is then applied over the hose end, body portion 12 first, until the bared end 20 is within the frusto-conical shoulder 17, as seen in Figure 1. Upon insertion and screwing home of the gripper 14, as in Figure 2, the bared braid portion 20 is deformed and distorted radially outwards into a frusto-conical shape and securely gripped and anchored between the opposed surfaces 16 and 17 when these grip the braid between them. These surfaces 16 and 17 may, if desired, be peripherally or otherwise ribbed, recessed, serrated, roughened or similarly formed with the object of increasing the hold of the ferrule and gripper on the braid 20. Furthermore, the action of screwing the gripper into the ferrule presses the forward end of the gripper against the end of the hose compressing the rubber or like material of the hose against the forward end of the gripper and thereby effecting a tight fluid seal.

The unbared end portion 21 of the hose adjacent the bared reinforcing braid 20 is enclosed in the portion of the ferrule body 12 extending away from the inner end of the gripper 14 and the inner surface of this part of the ferrule is internally reinforced, for example with a screw thread to facilitate screwing the ferrule onto the hose. It will also be noted from Figures 1 and 2 that, in the relaxed condition of the hose at this stage of the assembly, the hose carcase does not penetrate to the roots of teeth 22.

Figure 3:
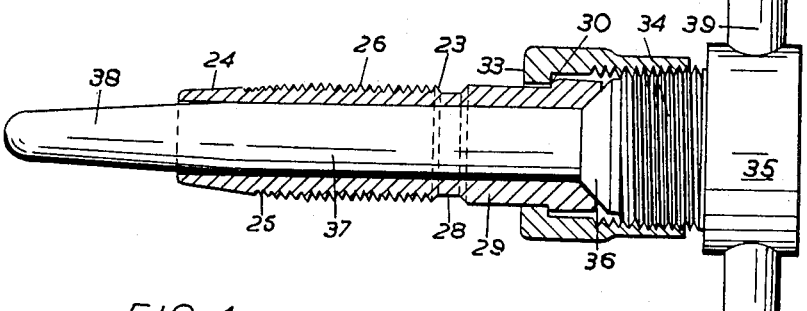
Figure 3 is an axial section of the separate spigot, used in this embodiment, carrying a coupling or union element and mounted on an assembling tool.

The hose 18 is expanded into the ferrule and into firm engagement with the internal teeth 22 thereof, so as to fill the grooves, by means of a tubular spigot 23. This spigot 23, see Figure 3, is of uniform bore diameter throughout its length, which is somewhat greater than that of the ferrule 10. At its leading end 24 the spigot 23 is externally tapered and formed over part of its length with a screw thread. Behind these is a cylindrical section with external threading 26 designed to mate with a corresponding internal screw thread 27 in the gripper 14. The threading 26 is adjoined, through a necked portion 28, by the head 29 of the spigot, which is formed with an annular shoulder 30 and a frusto-conical seat 31 at the bore exit for engagement with a co-operating element to which the end fitting will, in use, be attached.

In securing the spigot 23 in the fitting, a swivel nut 32 is threaded over the same so that the flange 33 on this nut bears against the shoulder 30. The nut 32 is then screwed up on the externally threaded boss 34 on an assembly tool 35 until the seal 31 abuts against a corresponding conicity 36 on the boss 34. The tool 35 has a long shank 37 which forms a supporting mandrel for the spigot and has a tapered nose 38.

Figure 4:
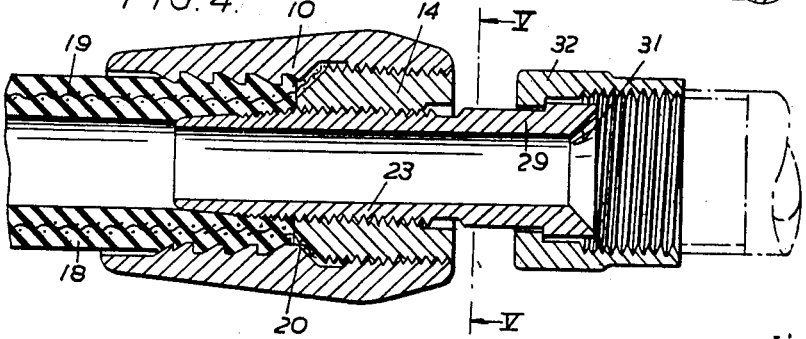
Figure 4 illustrates a further stage in the application of the end fitting, in which the spigot has been secured in the gripper and the assembly tool of Figure 3 removed.

The spigot 23 is then screwed home into the gripper 14 by first inserting the nose 38 through the partly-assembled fitting and then rotating tool 35 by means of a cross bar 39 thereof, the leading end 24 of the spigot forcing the hose carcase into the ferrule teeth 22, and the spigot 25 making a fluid tight seal from the inside. As seen in Figure 4, the spigot 23 then passes axially through the tubular gripper 14 and into the bore of the hose and extends inwards for nearly the whole length of the end fitting.

When the spigot has been forced into the hose, the latter is held between the ferrule 10 and the spigot 23 to make a leakproof joint.

The modified form of spigot 40 seen in Figure 6 is in most respects similar to the spigot 23 already described, performing the same function and being used and assembled in similar fashion. It will, however, be observed that it is somewhat longer than spigot 23 and will therefore extend through the complete length of the ferrule, the increased length being furnished by the leading end which is toothed throughout its length. This end 41 is externally tapered and provided with a series of grooves which form annular teeth 42 of buttress shape. These again point towards the rear end of the spigot or fitting and thus represent a set of barbs which augment the grip on the hose for the purpose of effecting a fluid tight seal.

In the alternative embodiment of the invention illustrated by Figures 7 and 8, instead of the spigot or insert and the tubular gripper being made as separate elements, they are formed integrally together. The result is the member 43 having a general form similar to that of the spigot 40 of Figure 6, but with a cylindrical enlarged body portion 44 intermediate its ends, this body having a frusto-conical face 45 to perform the braid-trapping function in co-operation with ferrule surface 17, and a peripheral thread 46 to be screwed up in the ferrule. Obviously, the face 45 might be convex or spherical as illustrated in Fig. 9. Conveniently this combination gripper and spigot member may be assembled with the ferrule and hose by a tool such as 35, one operation enabling, in effect, two stages of the previous assembly method to be carried out.

In this case, however, it will be convenient to have the coupling nut 32 attached rotatably to the spigot head 29 by means of a thrust wire 47 because the diameter of the body 44 of the member 43 is greater than the internal diameter of the nut and cannot therefore be threaded through this coupling nut. This thrust wire 47 is, in the instance illustrated, of square section and is inserted through a lateral passage 48 in nut 32 so as to lodge between flange 33 and the shoulder 30.

Although an internally threaded coupling or swivel nut, i. e. a female type of connection has been illustrated for uniting the coupling to a further fitting, it should be understood that alternatively the spigot may be provided at its outer end with any other suitable mating part, male or female, for engagement with any co-operating part of the fitting to which the hose is to be connected.

With a coupling constructed according to either of the embodiments of the invention above described and illustrated in the drawings, a marked advantage is achieved in that substantially all the tensile loads to which the hose is subjected are taken directly by the reinforcement braid 19 by which these loads are transferred to the ferrule 10 and the tubular gripper 14 or the composite form of gripper 43, thus ensuring that the fitting will not be blown off the hose in, for example, a flame test such as referred to above. Furthermore, this construction results in 100% electrical bonding of the hose coupling to the wire braid reinforcement.

In addition the fittings are relatively easy to attach to the hose and can be detached and re-used when desired.

With an end fitting constructed in accordance with this invention there is, moreover, very much less danger than hitherto of the rubber or the like of the hose, particularly within the reinforcement of the latter, being carbonised when the end fitting is subjected to heat, and consequently there is much less danger of the end fitting becoming inoperative or unsatisfactory in use in these circumstances.

I claim:

1. The combination with a smooth bore flexible rubber or synthetic rubber hose having at least one metallic reinforcing layer consisting of a plurality of wires braided or laid in such a way as to contain the internal pressure in the hose and to absorb the end loads when said wires are attached mechanically to a suitable hose fitting, said reinforcing metallic layer encircling at least a portion of the rubber, said reinforcing wires projecting beyond the end of the synthetic rubber hose, and of a detachable and reusable hose coupling comprising a ferrule having one end portion surrounding the exterior of the hose end and a shoulder adjacent the inner end of said one end portion, an internally threaded tubular gripper releasably secured coaxially in the other end of said ferrule and gripping said reinforcing wires against said shoulder, and a tubular insert releasably threaded into the gripper with its forward end portion projecting beyond said gripper into said hose to clamp said hose end against said one end portion of said ferrule and make a fluid tight seal with said hose.

2. In the combination of claim 1, said ferrule having internal teeth formed in said one end portion to interlockingly engage said rubber hose.

3. The combination with a smooth bore flexible non-metallic hose having at least one metallic reinforcing layer consisting of a plurality of wires braided or laid in such a way as to contain the internal pressure in the hose and to absorb the end loads when said wires are attached mechanically to a suitable hose fitting, said reinforcing metallic layer encircling at least a portion of the hose, said reinforcing wires extending from the hose near the end of the hose, and of a detachable and reusable hose coupling comprising a ferrule having one end portion surrounding the exterior of the hose end and an internal annular shoulder in said ferrule and internally threaded tubular gripper means releasably secured coaxially in the other end of said ferrule, said gripper means having a shoulder complementary to said first shoulder for gripping said reinforcing wires therebetween, and a tubular insert releasably threaded into the gripper means with its forward end portion projecting beyond said gripper means into said hose to clamp said hose against said ferrule and make a fluid tight seal with said hose.

References Cited in the file of this patent
UNITED STATES PATENTS

| | | |
|---|---|---|
| 1,819,243 | Hubbard | Aug. 18, 1931 |
| 2,278,239 | Butler | Mar. 31, 1942 |
| 2,431,522 | Trevaskis | Nov. 25, 1947 |